April 7, 1925. 1,532,604
P. SCHMITZ
OVERFLOW ALARM
Filed Dec. 18, 1922
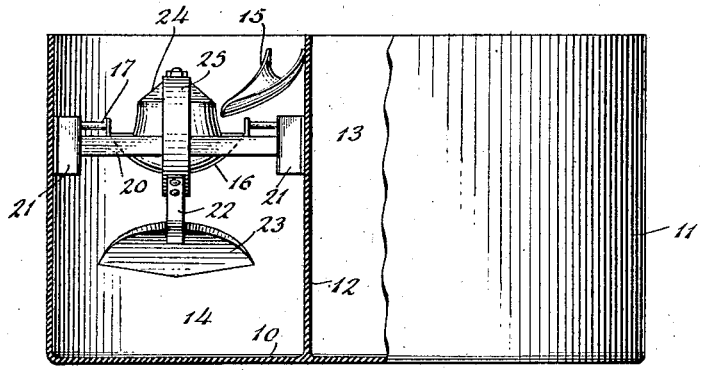
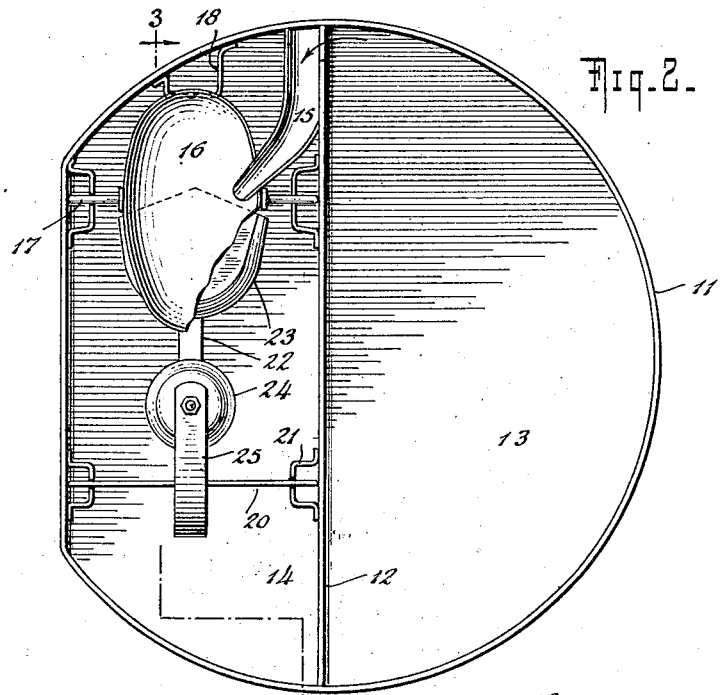
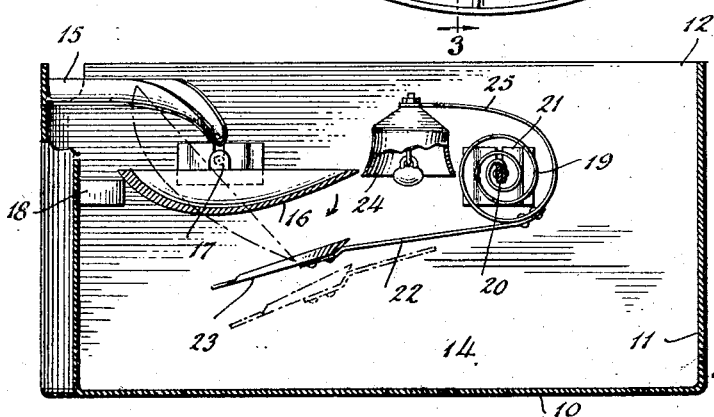
INVENTOR
PETER SCHMITZ
BY
Locke, Kehlenbeck & Methé
ATTORNEYS Patented Apr. 7, 1925.

1,532,604

UNITED STATES PATENT OFFICE.

PETER SCHMITZ, OF NEW YORK, N. Y.

OVERFLOW ALARM.

Application filed December 13, 1922. Serial No. 607,481.

*To all whom it may concern:*

Be it known that I, PETER SCHMITZ, a citizen of the United States, and resident of the borough of Manhattan, city, county, and State of New York, have invented certain new and useful Improvements in Overflow Alarms, of which the following is a specification.

My invention relates to devices for giving a warning or signal in the case of an overflow of a liquid. The device described and illustrated herein as an example of my invention has been devised particularly for use in connection with the receptacle or pan receiving the drip of water resulting from the melting of ice in a household ice-box or the like. It will be obvious, however, that the features of my invention may be utilized in other relations.

The accompanying drawings shows, in Fig. 1, a side elevation of a device embodying my invention and adapted to be set under an ice-box, parts of the device being broken away and others in section; Fig. 2 is a plan view with a portion broken away; and Fig. 3 is a vertical section on line 3—3 of Fig. 2.

The device illustrated is made as a unit in the form of a receptacle having a bottom 10, an upwardly-extending peripheral wall 11, and a transverse vertical partition 12 which divides said receptacle into two compartments, here shown of different sizes, one of which, 13, serves as a drip pan to receive the water from the usual outlet of the ice-box or the like, while the other compartment, 14, is adapted to receive the overflow from the compartment or pan 13, through an overflow channel or spout 15. Of course, the combination of the two pans 13, 14 into a unitary structure is not absolutely essential, although I prefer it on account of its simplicity. The liquid reaching the overflow channel 15 is discharged into the compartment or pan 14 in such a way as to actuate a signal or alarm. In the particular embodiment of my invention illustrated the channel 15 delivers the overflow liquid to a spoon-like tilting container 16 arranged in the upper portion of the compartment or pan 14 and pivoted about a horizontal axis 17. The weight of the container 16 is so distributed relatively to the pivot 17 on which it swings, that normally (that is, with the container 16 empty) the container will assume a substantially horizontal position, the heavier portion of the container then bearing on a stationary support 18. Even when water begins to flow into the spoon-like container 16, it will first remain mostly on the heavier side of the container, that is to say, the side between the support 18 and the pivot 17. To secure this result, the bottom wall of the container is inclined at a greater angle to the horizontal on the side of the pivot 17 toward the support 18 than on the opposite side of the said pivot. However, as more and more water flows into the container 16, there will come a moment when the weight of the water accumulating on the side of the pivot 17 distant from the support 18, will be sufficient to tip or tilt the container on its pivot, in the direction indicated by the arrow. At that time, the container 16 will be almost full, and thus the weight of the water held therein will be relatively considerable. As soon as the container tilts in the direction indicated, the water will run toward the free (lower) end of the container, thus transferring considerable weight to that side of the pivot, and increasing quite materially the force and the speed of the tilting movement. In the path of the water discharged from the free end of the container 16, and in the path of that end itself, I have shown the alarm proper, consisting of a coiled elastic strip member 19, preferably of metal, the inner end of which is secured to a stationary rod or support 20, set in brackets 21, and to the outer portion of the coil is secured a bar 22 which may be substantially straight, and carries a plate 23 extending into the path of the container 16 and of the water discharged therefrom. This elastic member carries an alarm, such as a bell 24, preferably on the outer end portion 25 of the coil. As the tilting container 16 strikes this plate 23 with considerable force, the tinkling of the bell 22 will give an audible warning of the fact that the pan 13 is beginning to overflow, and that this pan ought to be emptied. However, the device will not limit itself to giving a single alarm, but such alarm will be repeated periodically. It will be obvious that when the container 16 tilts to sound an alarm as described, the water will be discharged therefrom into the pan 14, and as soon as the container 16 has thus been emptied, it will return quickly to its normal substantially horizontal position. Then, as more water overflows from the pan 13 through the channel 15, the container 16 will be rocked again, and thus the alarm will be repeated. Of course, after a certain length of time the pan 14 will fill up to such an extent as to block the tilling movement of the container and the giving of the alarm. With a suitable choice of dimensions, however, hours will elapse before the alarm ceases to work, and I have found it easy to construct a device of this type which would continue ringing at intervals all day (twelve hours or more) before the water rose sufficiently in the pan 14 to stop the operation.

Various modifications may be made without departing from the nature of my invention as defined in the appended claims.

I claim:

1. A device comprising a movable container constructed to occupy a receiving position when empty, and to move from such position when filled, and an alarm having a portion located in the path of said container to be operated thereby.

2. A device comprising a movable container constructed to occupy a receiving position when empty, and to move from such position when filled, and an alarm consisting of an elastic member having a portion located in the path of said container, and a bell carried by said member.

3. A device comprising a movable container constructed to occupy a receiving position when empty, and to move from such position when filled, and an alarm consisting of a coiled elastic strip having a projection extending into the path of said container, and a bell carried by said strip.

4. A device comprising a movable container constructed to occupy a receiving position when empty, and to move from such position when filled, and an alarm consisting of a coiled elastic strip, a bell carried by said strip, an arm extending from said strip, and a plate on said arm, located in the path of said container.

In testimony whereof I have signed this specification.

PETER SCHMITZ.